(12) United States Patent
Savard et al.

(10) Patent No.: US 7,123,795 B2
(45) Date of Patent: Oct. 17, 2006

(54) METHODS FOR THE ALIGNMENT AND CALIBRATION OF THE SPECTRAL RESPONSES OF OPTICAL FILTERS

(75) Inventors: Simon Savard, Cap-Rouge (CA); Richard L. Lachance, Sainte-Foy (CA); Alain Mailloux, Québec (CA)

(73) Assignee: Teraxion Inc., Quebec (CA)

( * ) Notice: Subject to any disclaimer, the term of this patent is extended or adjusted under 35 U.S.C. 154(b) by 0 days.

(21) Appl. No.: 11/259,641

(22) Filed: Oct. 25, 2005

(65) Prior Publication Data

US 2006/0110105 A1    May 25, 2006

Related U.S. Application Data

(60) Provisional application No. 06/621,049, filed on Oct. 25, 2004.

(51) Int. Cl.
*G02B 6/34* (2006.01)

(52) U.S. Cl. .................... 385/37; 250/227.18

(58) Field of Classification Search ............... 385/12, 385/13, 37, 136, 137; 372/6, 20, 32, 102; 250/227.18
See application file for complete search history.

(56) References Cited

U.S. PATENT DOCUMENTS

| | | | |
|---|---|---|---|
| 5,774,619 A * | 6/1998 | Bruesselbach | 385/137 |
| 6,396,855 B1 * | 5/2002 | Tam et al. | 372/20 |
| 6,498,891 B1 | 12/2002 | Montesanto et al. | |
| 6,937,793 B1 | 8/2005 | Lelievre et al. | |
| 2005/0002609 A1 * | 1/2005 | Bylander | 385/37 |

* cited by examiner

*Primary Examiner*—Hemang Sanghavi
(74) *Attorney, Agent, or Firm*—Darby & Darby

(57) ABSTRACT

A method for aligning the spectral responses of two comb-like optical filters is provided. This method does not necessitate the use of spectrally-resolved equipment, as it uses the optical power correlation profile of a broadband light signal representative of the combined spectral responses of the two filters. In one embodiment, the power correlation profile is compared to a pre-stored profile. A tuning method for tuning two filters using this alignment method is also provided. The two filters are first relaxed to an unstretched position, and the second filter is stretched and aligned with the first. The first filter is also stretched and aligned with the other. Both filters are then stretched at a calibrated value.

33 Claims, 6 Drawing Sheets

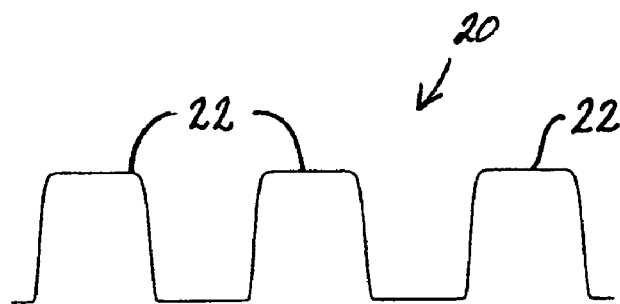
FIG. 1A
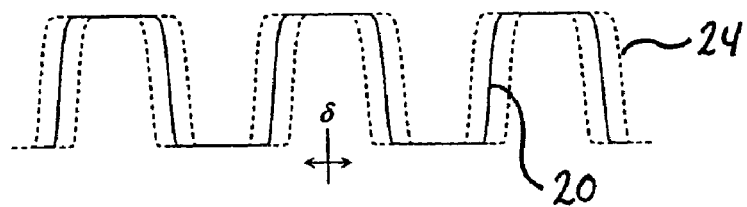
FIG. 1B
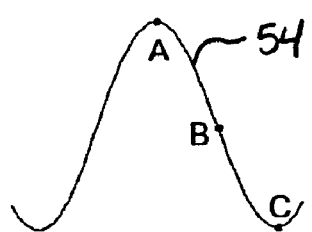
FIG. 2
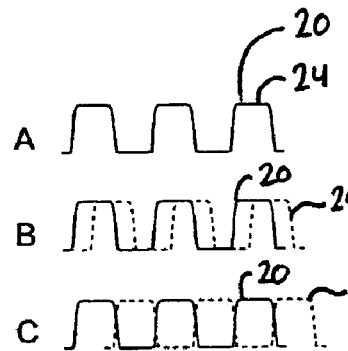
FIG. 2A
FIG. 2B
FIG. 2C FIG. 3A
FIG. 3B
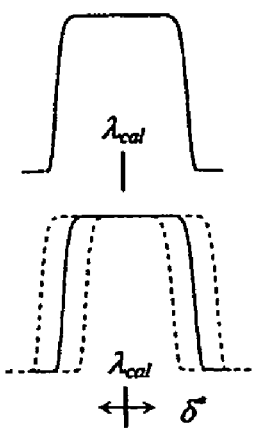
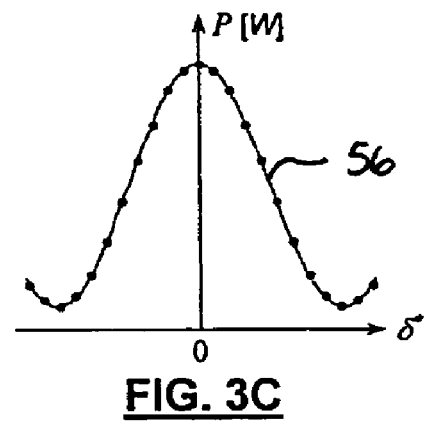
FIG. 3C
FIG. 4A
FIG. 4B
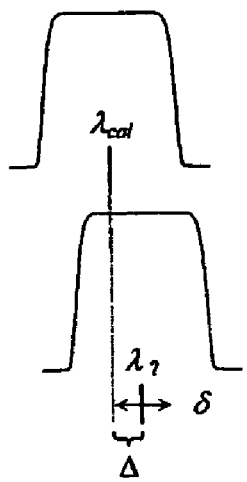
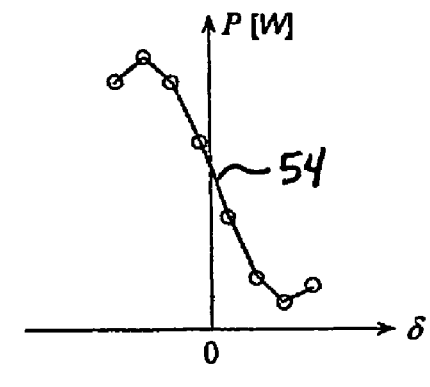
FIG. 4C
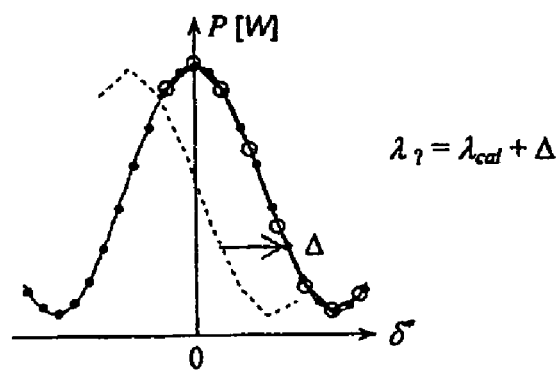
FIG. 5

Relaxed first grating:

Relaxed second grating:

$\lambda_2^1 = \lambda_1^{*2}$ $$\lambda_1^j = \lambda_2^j$$

$$\lambda_1^j \approx \lambda_2^j$$

METHODS FOR THE ALIGNMENT AND CALIBRATION OF THE SPECTRAL RESPONSES OF OPTICAL FILTERS

FIELD OF THE INVENTION

The present invention relates to the alignment of the optical responses of two or more optical filters such as Fiber Bragg Gratings (FBGs) with respect to each other. The present invention also relates to the calibration of the spectral response of such filters.

BACKGROUND OF THE INVENTION

Optical filters are important components of optical devices dealing with multi-wavelength light signals. Such filters, such as Bragg gratings, Fabry-Perot etalons, etc, often present a comb-like spectral response, i.e. their reflectivity or transmission characteristics have a certain periodicity as a function of wavelength. Fiber Bragg Gratings are one type of such filters which are widely used in a lot of applications of photonics, and more particularly in optical telecommunications devices. In a lot of these applications the spectral response of two or more FBGs, either single or multi-channel, must be precisely known, that is, precisely aligned one with respect to another, and with absolute spectral position if possible. To obtain such an alignment and calibration, spectrally-resolved equipment is generally required, such optical spectrum analyzers (OSA) or other calibration apparatuses. Access to such equipment is however not always forthcoming and their use in the field is both costly and unpractical.

There is a need to devise a method to perform such an operation, simply and at low cost, without requiring optical spectrum analyzers or other calibration apparatuses.

A particular application where such a precise spectral alignment is needed is in the case of dispersion compensators, FBG-based tunable optical devices in which two chirped gratings are sometimes stretched with respect to one another to generate a combined specific optical response at given specific wavelengths (that can be continuous along the optical band). A non-restrictive example of such a dispersion compensator is shown in Applicant's own U.S. Pat. No. 6,937,793 (LELIÈVRE et al), which is incorporated herein by reference.

Given the high wavelength dependency of such a device, a precise calibration of the spectral response of both gratings is needed in order to precisely position them and get the expected spectral response and dispersion level. This calibration should be easy to obtain again at any point during the lifetime of the device, should the spectral positions of the grating drift over time or be lost after a malfunction of the system it is part of. This should be done without resorting to a spectral analysis, as wavelength-specific optical monitoring is not always available (nor wanted) in practice during this operation.

There is therefore a need for an absolute calibration of both gratings spectral position.

SUMMARY OF THE INVENTION

In accordance with a first aspect of the present invention, there is provided a method for aligning the spectral response of a tunable comb-like optical filter with the spectral response of a reference comb-like optical filter. The method includes the steps of:

i. propagating a broadband light signal through the tunable and reference optical filters successively, thereby obtaining an output light signal representative of the combined spectral responses of these optical filters;

ii. tuning the tunable optical filter to a plurality of test stretched positions, and measuring a corresponding optical power of the output light signal for each of the test stretched positions;

iii. determining, based on this measuring, an optimal stretched position of the tunable optical filter for which the spectral response thereof is aligned with the spectral response of the reference optical filter; and iv. tuning the tunable optical filter to the optimal stretched position.

Advantageously, the method above uses the optical power spectral correlation between the combined spectral responses of two optical filters to align precisely these spectral responses with respect to each other.

In a preferred embodiment of the invention, the tuning positions correspond to the value of a strain in a waveguide segment hosting the tunable optical filter, preferably a FBG, and the continuous measurement of power with respect to mechanical position constitutes the optical correlation which gives the degree of match through the level of reflected power through both filters. The maximum integrated power is thus attained when the reflection features of the spectral response of both filters coincide. Various existing algorithmic methods may be used to precisely extract the position of maximum intensity in the correlation signal.

According to another aspect of the invention, there is also provided a method for tuning first and second optical filters. Each of these optical filters has a comb-like spectral response defining a plurality of periodical channels. The spectral response of each optical filter is tunable by stretching the corresponding optical filter to a plurality of stretched positions, and is known at an unstretched position.

The method includes the steps of:

a) tuning the first and second optical filters to their unstretched position;

b) tuning the second optical filter to a stretched position;

c) precisely aligning the spectral response of the second optical filter with the spectral response of the first optical filter using the method above, wherein the second optical filter defines the tunable optical filter and the first optical filter defines the reference optical filter;

d) tuning the first optical filter to a stretched position;

e) precisely aligning the spectral response of the first optical filter with the spectral response of the second optical filter using the method above, wherein the first optical filter defines the tunable optical filter and the second optical filter defines the reference optical filter.

In accordance with yet another aspect of the invention, there is also provided a method for tuning first and second optical gratings. Each of these optical gratings has a spectral response defining a plurality of periodical channels, including a first and a second channel. The spectral response of each of these optical gratings is tunable by stretching the corresponding optical grating to a plurality of stretched positions, the spectral response of each optical grating being known at an unstretched position where the first channel of the second grating has a central wavelength greater than the first channel of the first grating. The method includes the steps of:

a) tuning the first and second optical gratings to their unstretched position;

b) spectrally aligning the first channel of the second grating with the second channel of the first grating. This aligning includes the substeps of:
   i. propagating a broadband light signal through the first and second optical gratings successively, thereby obtaining an output light signal representative of the combined spectral responses of the optical gratings;
   ii. progressively stretching the second optical grating, and monitoring a corresponding optical power of the output light signal during this stretching;
   iii. determining, based on said monitoring, an optimal stretched position of the second optical grating for which the spectral response thereof is aligned with the spectral response of the first optical grating; and
   iv. tuning the second optical grating to its optimal stretched position;
c) spectrally aligning the first channel of the first grating with the first channel of the second grating. This aligning includes the substeps of:
   i. propagating the broadband light signal through the first an second optical gratings successively, thereby obtaining the output light signal representative of the combined spectral responses of the optical gratings;
   ii. progressively stretching the first optical grating, and monitoring the corresponding optical power of the output light signal during this stretching;
   iii. determining, based on said monitoring, an optimal stretched position of the first optical grating for which the spectral response thereof is aligned with the spectral response of the second optical grating; and
   iv. tuning the first optical grating to its optimal stretched position.

Finally, according to yet another aspect of the invention, there is provided an improvement in an optical device including first and second optical filters, each of these optical filters having a spectral response defining a plurality of periodical channels. The device includes:
   a tuning mechanism for tuning each of the optical filters to one of a rest position for which the spectral response of the corresponding filter is known and a plurality of tuning positions for which this spectral response is modified;
   a broadband light source for generating a broadband light signal;
   an optical arrangement for propagating the broadband light signal through the first and second optical filters successively, thereby obtaining an output light signal representative of the cumulative spectral responses of the optical filters;
   a detector for detecting the output light signal; and
   a controlling application for controlling the optical device.

The improvement includes providing the controlling application with a calibrating module for calibrating the first and second optical filters. The calibrating module performs the steps of:
a) instructing the tuning mechanism to tune the first and second optical filters to their rest position;
b) instructing the tuning mechanism to stretch the second optical filter;
c) causing the precise alignment of the spectral response of the second optical filter with the spectral response of the first optical filter through the substeps of:
   i. instructing the broadband light source to propagate the broadband light signal through the first and second optical filters successively, thereby generating the output light signal representative of the cumulative spectral responses of the optical filters;
   ii. instructing the tuning mechanism to tune the second optical filter to a plurality of test tuning positions and obtaining, from the detector, a corresponding intensity of the output light signal for each of said test tuning positions;
   iii. determining, based on the corresponding intensities, an optimal tuning position of the second optical filter for which its spectral response is aligned with the spectral response of the first optical filter; and
   iv. instructing the tuning mechanism to tune the second optical filter to this optimal stretched position;
d) instructing the tuning mechanism to tune the first optical filter to a tuning position offset the rest position; and
e) causing the precise alignment of the spectral response of the first optical filter with the spectral response of the second optical filter, through the substeps of:
   i. instructing the broadband light source to propagate the broadband light signal through the first and second optical filters successively, thereby generating the output light signal representative of the cumulative spectral responses of the optical filters;
   ii. instructing the tuning mechanism to tune the first optical filter to a plurality of test tuning positions and obtaining, from the detector, a corresponding intensity of the output light signal for each of the test tuning positions;
   iii. determining, based on these corresponding intensities, an optimal tuning position of the first optical filter for which its spectral response is aligned with the spectral response of the second optical filter; and
   iv. instructing the tuning mechanism to tune the first optical filter to the optimal tuning position.

Other features and advantages of the present invention will be better understood upon reading of preferred embodiments thereof with reference to the appended drawings.

BRIEF DESCRIPTION OF THE DRAWINGS

FIG. 1A shows a typical spectral reflectivity of a Bragg grating as a function of wavelength; FIG. 1B shows the spectral reflectivity of a second Bragg grating with respect to the grating of FIG. 1A during tuning.

FIG. 2 shows a power correlation signal according for two gratings according to FIGS. 1A and 1B; FIGS. 2A, 2B and 2C show the superposed spectral responses of the two gratings for an optimum match (FIG. 2A), an intermediate mismatch (FIG. 2B) and a complete offset mismatch (FIG. 2C).

FIGS. 3A to 3C illustrate a step of obtaining a high-resolution reference optical correlation according to an embodiment of the invention; FIG. 3A shows the reflectivity of one channel of the gratings when both are aligned at a reference wavelength $\lambda_{cal}$; FIG. 3B shows the relative detuning of the gratings of FIG. 3A; and FIG. 3C shows the a high-resolution reference optical correlation obtained through this step.

FIGS. 4A to 4C illustrate a step of measuring the output power for several tuning positions; FIG. 4A shows the reflectivity of one channel of the first grating at the reference wavelength $\lambda_{cal}$; FIG. 4B shows the detuning of the second grating; and FIG. 4C shows the low-resolution optical correlation obtained through this step.

FIG. 5 illustrates a step of comparing the optical correlation of FIG. 4C to the reference optical correlation of FIG. 3C, yielding an offset value $\Delta$.

FIG. 8A illustrates a step of relaxing both filters to their rest position; FIG. 8B illustrates a step of aligning the spectral response of the second filter with the spectral response of the first filter; FIG. 8C illustrates a step of offsetting the second filter to compensate for the temperature dependence of its spectral response; FIG. 8D illustrates a step of tuning the first filter offset from its rest position and precisely aligning its spectral response with the spectral response of the second filter; and FIG. 8E illustrates a step of tuning both filters to a target tuning position.

DESCRIPTION OF PREFERRED EMBODIMENTS OF THE INVENTION

The present invention generally provides for the alignment and possible calibration of the respective spectral response of two "comb-like" optical filters, By the expression "comb-like", it is meant that the spectral response of each optical filter shows generally periodical reflectivity or transmission features. The period of these features need not be constant, nor do both filters need to be identical; they should however have sufficiently similar spectral responses to define an "aligned" state for which the total power reflected or transmitted by both filters is optimized. In one embodiment, the period of both spectral responses may be identical. In another embodiment, the period of one filter may be a multiple of the period of the other filter. The optical filters are preferably embodied by Bragg gratings, particularly FBGs, but the present invention may also be applied to other types of filters such as Fabry-Perot filters.

Figure 6:
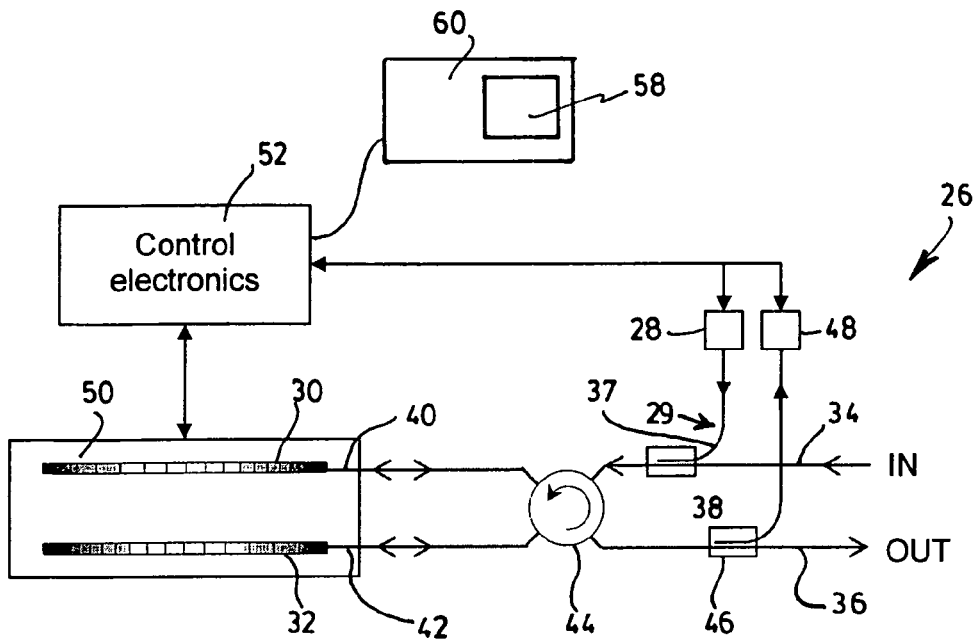
FIG. 6 is a schematical illustration of one device in which the present invention may be carried out.
Figure 7:
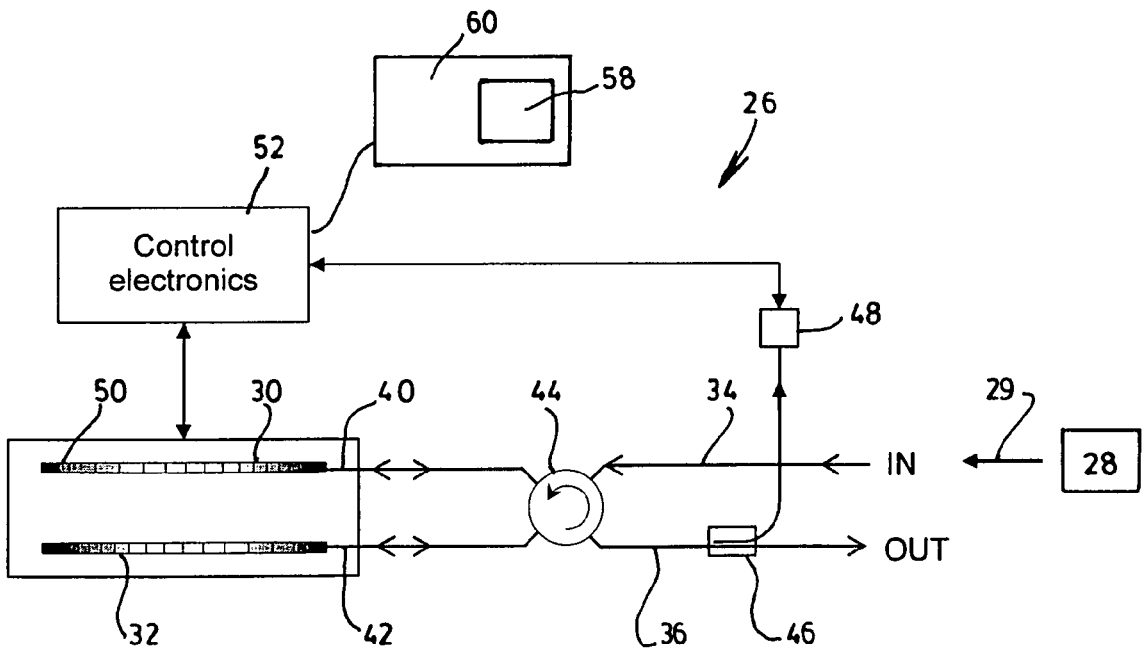
FIG. 7 is a schematical illustration of another device in which the present invention may be carried out.

Referring to FIG. 6 or 7, there are shown two variants of a possible optical system 26 in which the various aspects of the present invention may be embodied. The illustrated system 26 includes first and second optical filters 30 and 32. It will be understood that the designations "first" and "second" filters are used herein for convenience only and do not refer to a particular hierarchy between the filters. A tuning mechanism 50 for independently tuning the spectral response of each grating is preferably provided, such as an assembly for gradually stretching each grating as is well know in the art An example of an assembly for this purpose in the context of chromatic dispersion compensation, using a longitudinal spacing element in a temperature compensating apparatus on which the fiber hosting a FBG is mounted, is for example shown in assignee's U.S. Pat. No. 6,498,891, issued Dec. 24, 2002, which is incorporated herein by reference. Control electronics 52 may be provided for controlling the tuning mechanism 50 and other components of the system.

In the illustrated embodiment, the filters are FBGs forming together a variable dispersion compensator such as taught by U.S. Pat. No. 6,937,793 (LELIÈVRE et al). Although the present invention will be mostly described with reference to this particular example, it will be understood by one skilled in the art that its principles may be usefully applied to a number of other systems involving optical filters having an adjustable spectral response.

The illustrated system 26 includes an input arm 34 for receiving an optical signal to be processed and an output arm 36 for outputting the processed light signal. Preferably, the system 26 includes a broadband light source 28 for launching a broadband light signal 29 in the optical filters. In the embodiment of FIG. 6, the light source 28 is a LED connected to the input arm 34 through an optical fiber 37 and input optical coupler 38. In the embodiment of FIG. 7, the light signal is an ASE signal, for example from an optical amplifier, directly injected in the input arm of the system 26. The broadband light signal launched into the system 26 it is successively reflected by both the first filter 30 and the second filter 32. This may be in practice accomplished by providing the filters in optical fiber segments 40 and 42 connected by a 4-ports optical circulator 44. In this example, the incoming broadband signal is therefore coupled to the input arm 34, and through the circulator 44 is successively sent to the first filter 30, the second filter 32 and the output arm 36. In an alternative embodiment, the 4-port circulator could be replaced by a set of two 3-port circulators, as is well known in the art.

The system also preferably includes an output optical coupler 46 in the output arm 36 for extracting light therefrom for detection by a detector 48. This allows the monitoring of the combined spectral responses of both filters as will be seen below.

The systems of FIGS. 6 and 7 will be used in the description of the various aspects of the present invention for illustrative purposes. It is again understood that the present invention is not limited to application in such systems.

In accordance with a first aspect of the invention, there is therefore provided a method for aligning the spectral response of a "tunable" optical filter with the spectral response of a "reference" optical filter.

FIG. 1A shows the typical spectral shape 20 (reflectivity vs. wavelength) of a multi-channel Bragg grating as used in telecommunications devices, which includes a plurality of evenly spaced channels 22. In this example, the grating is used as a reference filter, and it may or may not have a calibrated position, depending whether or not precise calibration of the aligned filters is required for a given application. In cases where the spectral response of the reference filter is calibrated, this calibration may for example have been obtained through spectrally resolved measurements. Alternatively, the reference filter may be in a rest position, for example a relaxed state if it is tunable through the application of a strain, in which case the spectral response for a given temperature may be pre-measured and does not change over time.

The method according to this first aspect of the invention first includes a step of propagating a broadband light signal through the tunable and reference optical filters successively; an output light signal representative of the combined spectral responses of both optical filters is thereby obtained. By "broadband" light signal, it is meant that the light beam in question has a bandwidth sufficient to generally cover a useful portion of the bandwidth of both optical filters. The actual spectral profile of the broadband light signal does not need to be constant over the bandwidth of interest, as long as it remains stable during the alignement procedure. In the exemplary system of FIG. 6, this step would be accomplished by activating the light source 28, and launching the resulting broadband light signal in the input arm, 34 through input optical coupler 38, then through the circulator 44 to be successively reflected by the first grating 30 (the reference filter in this case), the second grating 32 (the tunable filter) and then to the output arm 36. It is extracted out of the output arm 36 by output coupler 46 which sends it to the detector 48. For the system of FIG. 7, the only difference is that the broadband light signal originates from outside the system 26 and is directly coupled into the input arm 34.

The method next includes a step of tuning the tunable optical filter to a plurality of test stretched positions, and measuring the corresponding optical power of the output light signal. In the preferred embodiment, the tuning of the filters is accomplished by progressively stretching the waveguide segment hosting the corresponding filter to induce a strain therein. For example, in the embodiment of U.S. Pat. No. 6,498,891, each stretched position will correspond to a number of steps on the motor controlling this stretching. The spacing between different test stretched positions is preferably selected so as to be able to identify a peak in the monitored total reflected power. By way of example, FIG. 1B shows the relative detuning δ of the spectral reflectivity 24 of a tunable optical filter with respect to the fixed spectral shape 20 of the reference filter of FIG. 1A. The relative displacement δ between the two spectral responses is scanned over a predetermined range of wavelength. In this embodiment, both filters are identical.

The present method then includes a steps of determining, based on the measuring of the previous step, an optimal stretched position of the tunable optical filter for which its spectral response is aligned with the spectral response of the reference optical filter, and tuning the tunable optical filter to this optimal position.

Referring to FIG. 2, there is shown the shape of a typical correlation profile 54 obtained by plotting the detected optical power of the output light signal as a function of stretched position of the gratings of FIG. 1B. The bell-shaped profile is therefore representative of the total power reflected by the two gratings as a function of the relative detuning δ. As can be seen in FIG. 2A, the point of maximum power output A will generally, but not always, correspond to the optimum match between the spectral responses 20 and 24 of the two gratings. Point B correspond to an intermediate mismatch as shown in FIG. 2B, and minima C corresponds to the case of a complete offset mismatch as shown in FIG. 2C. The stretched position corresponding to point A will generally be the optimal stretched position.

In order to find the optimal stretched position, different algorithmic techniques may be used, such as polynomial fitting of the correlation profile, minimization techniques to converge to the highest intensity point, etc. In practice, however, the top of the correlation profile is often irregular, flat, and even sometimes its absolute maximum does not exactly coincide with the exact optimum detuning. Referring to FIGS. 3A to 3C, 4A to 4C and 5, a numerical correlation technique has been devised comparing the measured power correlation profile at an unknown detuned position with respect to a pre-determined correlation profile measured over calibrated gratings with no detuning and stored.

In this particular embodiment, the method above includes a preliminary step of obtaining the pre-determined correlation profile. In this case, each filter is tuned to an initial stretched position (see FIG. 3A) where their spectral responses are precisely aligned. This may for example be achieved using an OSA or other spectrally-resolved equipment. Similarly to above, a calibrating broadband light signal is launched through both optical filters successively, thereby obtaining a calibrating output light signal representative of their combined spectral responses. The optical power of this calibrating output light signal is measured for a plurality of stretched positions of the tunable optical filter on either sides of its initial stretched position (see FIG. 3B). The pre-determined correlation profile 56 is then obtained by plotting the optical power of the calibrating output light signal as a function of stretched positions of the tunable optical filter (see FIG. 3C). As the actual stretched position for which the two filters are aligned is known from the spectrally-resolved measurements, the corresponding position along the pre-determined correlation profile can easily be identified.

FIGS. 4A to 4C illustrate how the actual power correlation profile around an unknown stretched position of the tunable filter is obtained according to the method above. By numerically correlating the numerical values of these two measured optical power correlation profiles, the predetermined one and the measured one, it is possible to precisely find the exact present detuning between the spectral responses of the two filters using an appropriate numerical method, such as a least squares residual minimization technique, using for example a simplex algorithm. In a preferred embodiment, the minimization technique is multi-dimensional, in that it involves simultaneously fitting the stretch of the spectral axis (or dimension), for example combined with an offset and/or stretch in the power axis (or dimension). This combination may advantageously minimize the error of the final fit between a reference and a later offset measurement in which the power scale has changed, due for example to supplementary losses.

As the profile of the correlation is used, the numerical matching algorithm method has many advantages: it is insensitive to the shape of the optical power correlation response, it benefits from the fact that it uses the whole shape features to "lock on" to the maximum correlation position (central part & wings), it is therefore quite insensitive to noise and very low power measurements can be made, and it does not require a large number of measurement points; a successful demonstration was realized with only 11 points.

Figure 9:
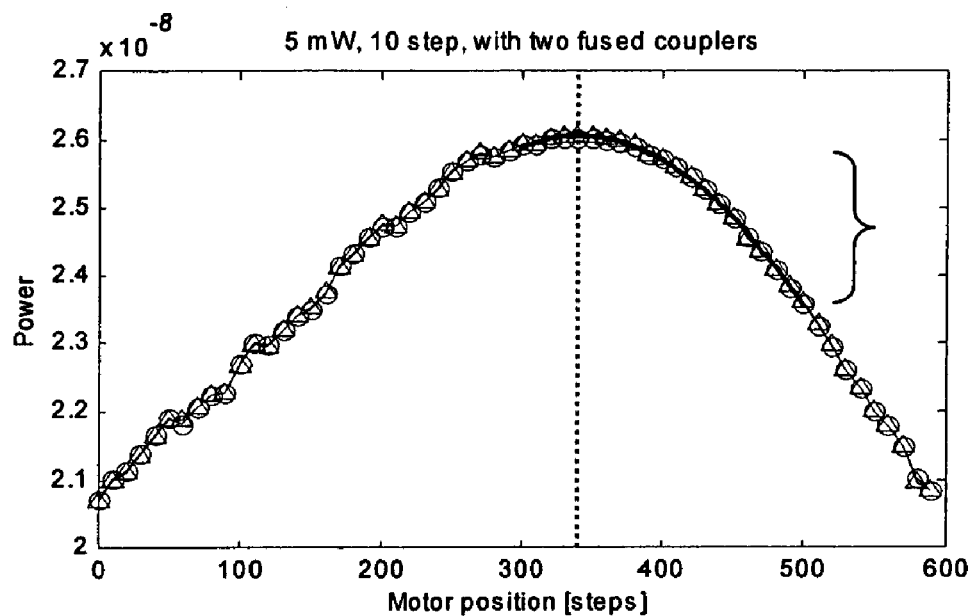
FIG. 9 illustrates a fitting technique according to an alternative embodiment of the invention.

Referring to FIG. 9, an alternative method is illustrated for cases where no calibration reference can be made. It simply consists in fitting, for example using a polynomial, the correlation profile in an adequate region (over an adequate number of points). This fit allows sub-sampling resolution of the order of the picometer.

The method described above provides for the precise alignment of the spectral response of two filters with respect to each other. It will be understood that in cases where the spectral response of the reference filter is already known, for example if this filter is embodied by a grating at rest or if it has been previously measured by spectrally-resolved equipment, then this method provides a convenient way of calibrating the second grating to an absolute value. It will be noted that the present invention may be embodied in devices where both filters play an active role, or alternatively the reference filter may be used for calibration purposes only. Finally, the method above may of course be used to align the spectral responses of more than two gratings together. Multiple gratings may be aligned with respect to each other using this technique.

In accordance with another aspect of the present invention, there is also provided a method for tuning first and second optical filters. This method is particularly directed to filters having a "comb-like" spectral response as defined above, and defining a plurality of periodical channels. The spectral response of each of these optical filters is tunable by stretching the corresponding optical filter to a plurality of stretched positions. The spectral responses of both filters are known where they are unstretched, and are usually measured for different temperatures upon manufacture of a given device.

Generally speaking, the tuning method according to this particular aspect of the present invention includes the following steps:
a) tuning the first and second optical filters to their unstretched position;
b) tuning the second optical filter to a stretched position;
c) precisely aligning the spectral response of the second optical filter with the spectral response of the first optical filter using an embodiment of the alignment method above, wherein the second optical filter defines the tunable optical filter and the first optical filter defines the reference optical filter;
d) tuning the first optical filter to a stretched position;
e) precisely aligning the spectral response of the first optical filter with the spectral response of the second optical filter using the an embodiment of the alignment method above, wherein the first optical filter defines the tunable optical filter and the second optical filter defines the reference optical filter.

With reference to FIGS. 8A to 8E, an embodiment of this method will be explained in more details. By way of example, the steps of this method will be described with reference to the tuning of two FBGs, for example the gratings of a variable dispersion compensator as shown in either FIG. 6 or FIG. 7. The gratings of this embodiment have a spectral response characterized by periodical evenly spaced reflectivity channels. The central wavelength of any given channel is denoted by $\lambda_i^{j(*)}$, where i is the grating identification, j is the channel number and the presence of an asterisk indicates wavelength values for an unstretched position.

Although the designation "first" and "second" gratings are used herein for convenience and do not reflect a particular hierarchy between the two gratings, it has been found useful in one embodiment to define by convention the grating having the smallest nominal wavelength as the "first grating", and the other as the "second grating", for reasons which will become clear further below.

Figure 8A:
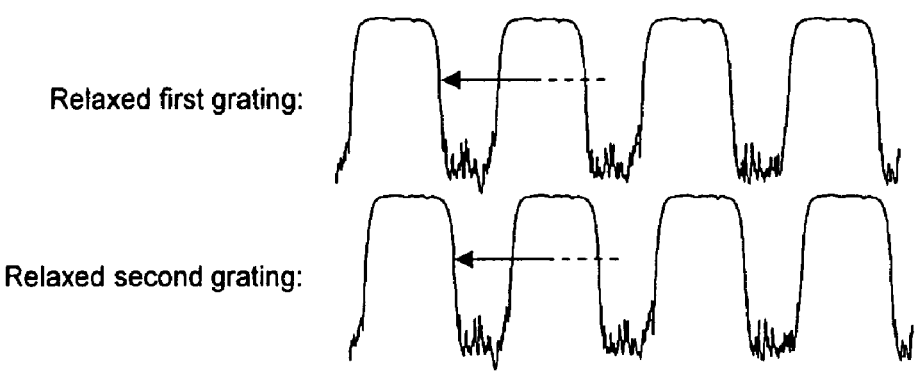
FIGS. 8A to 8E illustrate the steps of a method for tuning two optical filters according to one embodiment of the invention.

According to the first step of the present method, both the first and the second gratings are sequentially tuned to their unstressed position (FIG. 8A). This may be achieved by monitoring the intensity of an output light beam obtained as explained above, while the gratings are sequentially unstretched, and stopping relaxing each grating when no power variation is observed. This indicates that no tension is present in the grating as further mechanical relaxation no longer displaces its reflection spectral response. The spectral response of both gratings is then precisely known, as explained above.

Figure 8B:
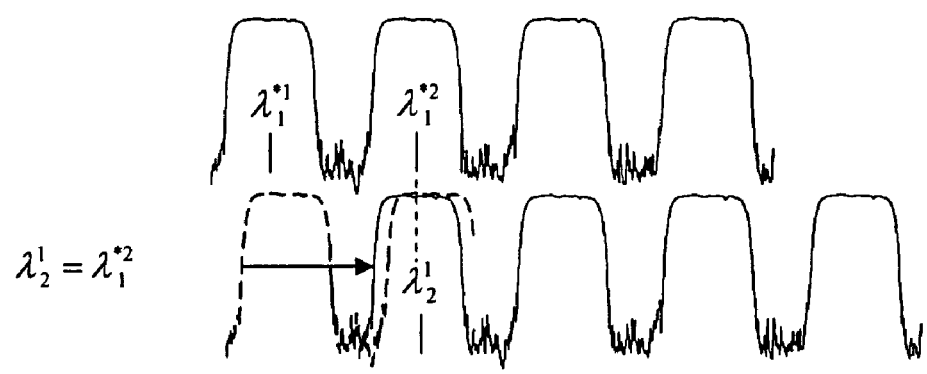

The next step involves spectrally aligning the first channel of the second grating with the second channel of the first grating (FIG. 8B). This is achieved by using propagating a broadband light signal through the first and second optical gratings successively, thereby obtaining the output light signal representative of the combined spectral responses of said optical gratings as explained above. the second optical grating is then progressively stretched, and the corresponding optical power of the output light signal monitored during this stretching. The optimal stretched position of the second optical grating for which the spectral response thereof is aligned with the spectral response of the first optical grating is then determined, based on this monitoring. The second optical grating can then be tuned to this optimal stretched position. It will be recognize that this technique is an embodiment of the alignment method described above.

The absolute position of the stretched second grating is therefore precisely known, as the central wavelength of its first channel corresponds to the calibrated measurement of the central wavelength of the second channel of the first grating in an unstretched position, that is, $\lambda_2^1 = \lambda_1^{2*}$.

Figure 8C:
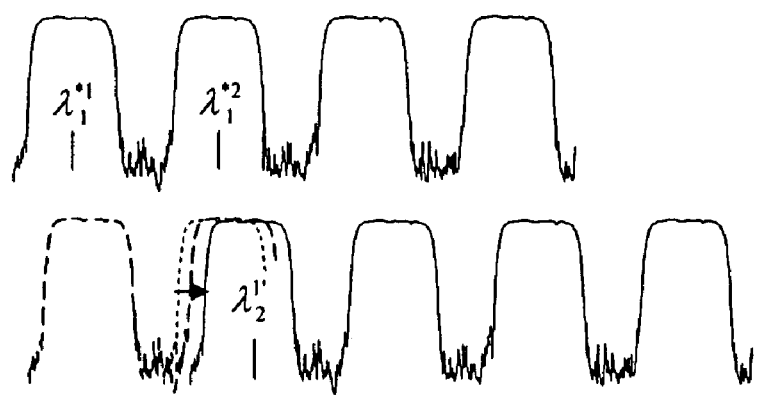

At this point, the method may include an optional step of offsetting the second grating from alignment with the first grating to compensate for a temperature dependence of its spectral response, according to known compensation values (FIG. 8C). This may be accomplished using a measurement of the current temperature, and knowing the quadratic dependence of wavelength on temperature, $$\lambda = aT^2 + bT + c \quad (1)$$

where a, b, and c are tabulated coefficients. The wavelength offset between the reference calibration temperature and the present temperature is calculated by the relation $$\delta\lambda = a(T^2 - T_0^2) + b(T - T_0). \quad (2)$$

The required displacement is then computer using interpolation in stretch tables.

Figure 8D:
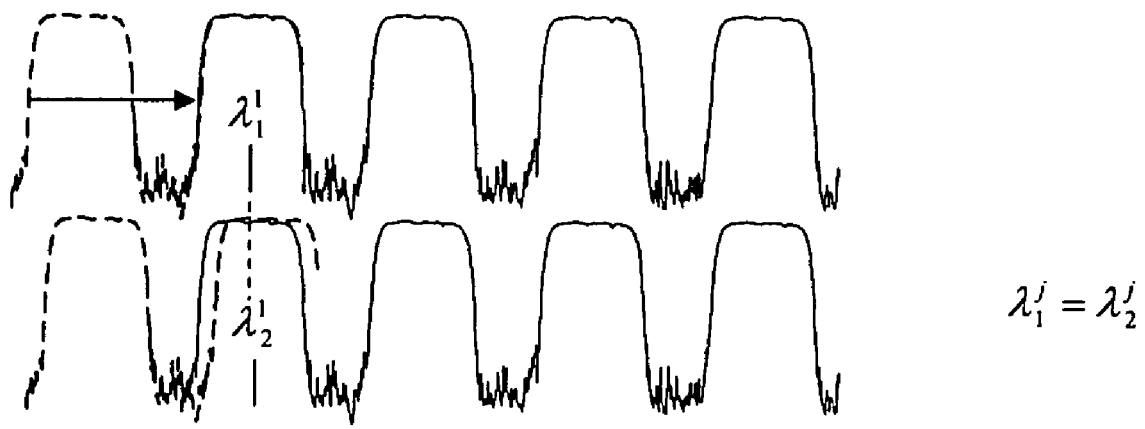

It is then the first grating's turn to be stretched, and its first channel is aligned with the first channel of the second grating in its stretched position, in the same manner as in the previous step (see FIG. 8D). This makes each channel of the first grating coincide with the corresponding channel of the second grating, that is, $\lambda_1^j = \lambda_2^j$. At this point, both gratings are therefore stretched, and their spectral reflectivity profiles are known and aligned. Their calibration has therefore been achieved.

Figure 8E:
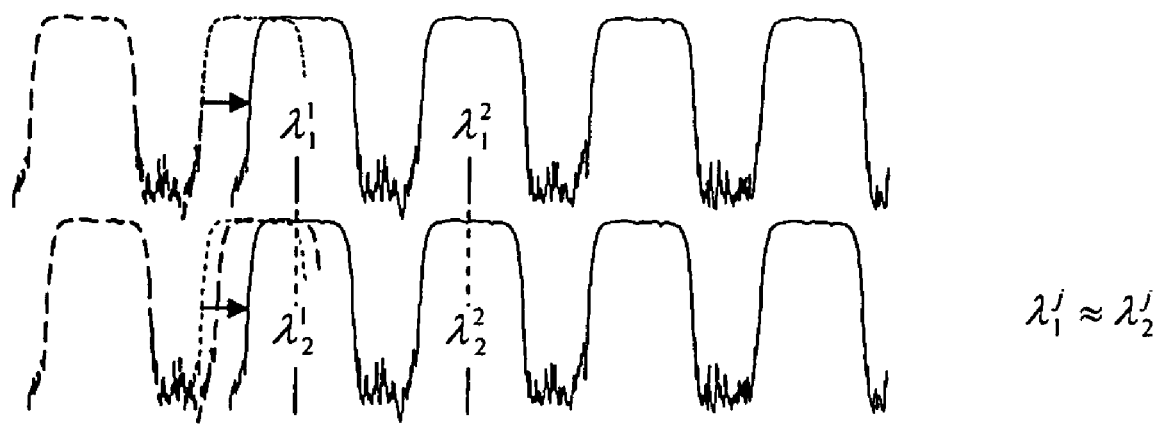

Once the spectral responses of the stretched gratings have been calibrated to an absolutely known value, they may be further tuned to a target position by using pre-stored displacement tables relating mechanical stresses to spectral positions (FIG. 8E). This last operation is done "à l'aveugle", based on the validity of the displacement tables: there is no guarantee that the final reached position will be absolute, but in practice, very precise positioning can be achieved using a stable and repeatable mechanical apparatus.

In the case where both gratings coincide in their target position, a final fine relative adjustment can be optionally performed using the optical power correlation method for a check of the relative position of both gratings.

Figure 10:
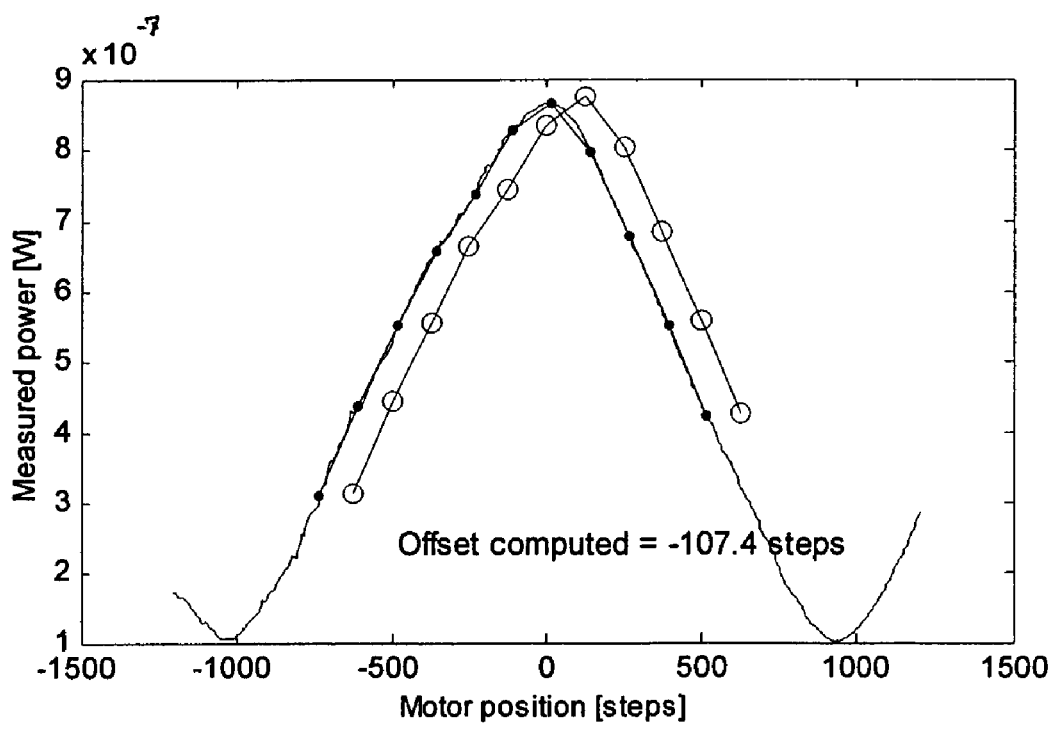
FIG. 10 shows the results of an experimental study illustrating the feasibility of the principle of the present invention.

Referring to FIG. 10, an experimental study using two fused couplers (instead of one as shown in FIG. 6 or 7), introducing a loss of −47 dB, demonstrated an adequate sensitivity of the system. Final position recovery within the picometers order was achieved with the optical power correlation method, following all of the previously enumerated steps.

Advantageously, the present invention may be embodied by the provision of a calibrating module 58 as part of a controlling application 60 for an optical device including two optical filters (see FIGS. 6 and 7). The method of the present invention may in this manner be transparent to the end user of the optical device, who only has to request calibration through the controlling application to launch a series of operations embodying the steps of the tuning method according to an embodiment of the invention. The device should include all the necessary components to perform this calibration, such as a tuning mechanism for independently tuning the optical filters, a broadband light source for generating the broadband light signal, an optical arrangement for propagating the broadband light signal through the optical filters successively, thereby obtaining the output light signal representative of the cumulative spectral responses of the filters, and a detector for detecting the output light signal.

Referring to FIGS. 6 and 7, the control application preferably sends appropriate instructions to the components of the system 26 through the control electronics 52. upon activation of the calibration module, it therefore generally performs the following steps:

a) instructing the tuning mechanism to tune the first and second optical filters to their unstretched position;
b) instructing the tuning mechanism to stretch the second optical filter;
c) causing the precise alignment of the spectral response of the second optical filter with the spectral response of the first optical filter through the substeps of:
   i. instructing the broadband light source to propagate the broadband light signal through the first and second optical filters successively, thereby generating the output light signal representative of the combined spectral responses of both optical filters;
   ii. instructing the tuning mechanism to tune the second optical filter to a plurality of test stretched positions and obtaining, from the detector, a corresponding optical power of the output light signal for each of these test stretched positions;
   iii. determining, based on this corresponding optical power, an optimal stretched position of the second optical filter for which the spectral response thereof is aligned with the spectral response of the first optical filter; and
   iv. instructing the tuning mechanism to tune the second optical filter to this optimal stretched position;
d) instructing the tuning mechanism to stretch the first optical filter; and
e) causing the precise alignment of the spectral response of the first optical filter with the spectral response of the second optical filter, through the substeps of:
   i. instructing the broadband light source to propagate the broadband light signal through the first and second optical filters successively, thereby generating the output light signal representative of the combined spectral responses of these optical filters;
   ii. instructing the tuning mechanism to tune the first optical filter to a plurality of test stretched positions and obtaining, from the detector, a corresponding optical power of the output light signal for each of these test stretched positions;
   iii. determining, based on the corresponding optical power, an optimal stretched position of the first optical filter for which the spectral response thereof is aligned with the spectral response of the second optical filter; and
   iv. instructing the tuning mechanism to tune the first optical filter to this optimal stretched position.

If necessary for a given application, the calibration module may further instruct the tuning mechanism to tune at least one of the first and second optical filters to a target stretched position using pre-stored calibration tables. The target position may for example be a nominal position from which further displacements are calculated. The compensation for the temperature dependence of the device may, as before, be performed after the second grating has been stretched.

In summary, various methods using the optical power correlation of the combined spectral response of two gratings have been devised. This powerful technique can for example use the correlation power of the combined reflection signals of two independently stretched FBGs to relatively adjust the position of the two gratings on top of each other. Using reference grating measurements recorded at unstretched positions, absolute positions can be deduced by cascaded measurements and proper processing as described in the present application. An algorithmic method using numerical correlation of a detuning measurement with respect to a reference detuning measurement allows rapid and precise computation of the different spectral offset values that need to be evaluated throughout the calibration process.

As one skilled in the art will readily understand, the application of the present method may be extended to more than two FBGs. Variations on the present method can also allow the relative and absolute positioning of single channel gratings, or any combination of single and multi-channel gratings.

For the purpose of precisely aligning an optical system, like a dispersion calibration device, the proposed calibration method is "absolute", in the sense that it uses direct measurements on the very reflection profile of the two constituting gratings (using the actual device's response). This includes every possible error: the sensing measure integrates all factors that can contribute to the different drifts over time. It also avoids indirect measurements. For example, position and homing sensors are very complex and expensive, and no long-term calibration can be assured by vendors. Finally, other independent sensors or methods can all deteriorate in time, and without absolute exterior reference, no one can ever be sure of the validity of the calibration.

Of course, numerous modifications could be made to the above described embodiments without departing from the scope of the present invention.

The invention claimed is:

1. A method for aligning a spectral response of a tunable comb-like optical filter with a spectral response of a reference comb-like optical filter, said method comprising the steps of:
   i. propagating a broadband light signal through the tunable and reference optical filters successively, thereby obtaining an output light signal representative of the combined spectral responses of said optical filters;
   ii. tuning the tunable optical filter to a plurality of test stretched positions, and measuring a corresponding optical power of the output light signal for each of said test stretched positions;
   iii. determining, based on said measuring, an optimal stretched position of the tunable optical filter for which the spectral response thereof is aligned with the spectral response of the reference optical filter; and
   iv. tuning the tunable optical filter to said optimal stretched position.

2. The method according to claim 1, wherein, in step i. said optical filters are used in reflection.

3. The method according to claim 1, wherein, in step i. said optical filters are used in transmission.

4. The method according to claim 1, wherein each of said tunable and reference optical filters is provided in a corresponding waveguide segment.

5. The method according to claim 4, wherein said tunable and reference optical filters are Bragg gratings.

6. The method according to claim 1, wherein the optimal tuning position determined in step iii. corresponds to a stretched position for which said output signal is maximal.

7. The method according to claim 1, wherein the determining of step iii. comprises plotting a power correlation profile defined as the optical power of the output signal as a function of stretched positions of the tunable optical filter.

8. The method according to claim 7, wherein the determining of step iii. comprises calculating a curve fit of said power correlation profile.

9. The method according to claim 8, wherein said curve fit is a polynomial fit.

10. The method according to claim 7, wherein the determining of step iii. comprises comparing said power correlation profile to a pre-determined correlation profile of said optical filters.

11. The method according to claim 10, wherein said comparing comprises using a least-squares residual minimization technique.

12. The method according to claim 10, comprising a preliminary step before step i. of measuring said pre-determined correlation profile of said optical filters.

13. The method according to claim 12, wherein said preliminary step comprises the substeps of:
   tuning each of said tunable and reference optical filters to an initial stretched position where the spectral responses thereof are precisely aligned, using spectrally-resolved measurements of said spectral responses;
   propagating a calibrating broadband light signal through the tunable and reference optical filters successively, thereby obtaining a calibrating output light signal representative of the combined spectral responses of said filters;
   measuring an optical power of the calibrating output light signal for a plurality of stretched positions of the tunable optical filter on either sides of the initial stretched position thereof;
   plotting the optical power of the calibrating output light signal as a function of stretched positions of the tunable optical filter, thereby obtaining said pre-determined correlation profile; and
   identifying a position along said pre-determined correlation profile for which the spectral responses of the reference and tunable filters are aligned.

14. A method for tuning first and second optical filters, each of said optical filters having a comb-like spectral response defining a plurality of periodical channels, the spectral response of each of said optical filters being tunable by stretching the corresponding optical filter to a plurality of stretched positions and being known at an unstretched position, said method comprising the steps of:
   a) tuning the first and second optical filters to the unstretched position thereof;
   b) tuning the second optical filter to a stretched position;
   c) precisely aligning the spectral response of the second optical filter with the spectral response of the first optical filter using the method of claim 1, wherein the second optical filter defines the tunable optical filter and the first optical filter defines the reference optical filter;
   d) tuning the first optical filter to a stretched position;
   e) precisely aligning the spectral response of the first optical filter with the spectral response of the second optical filter using the method of claim 1, wherein the first optical filter defines the tunable optical filter and the second optical filter defines the reference optical filter.

15. The method according to claim 14, comprising a step between step c) and step d) of offsetting the second filter from alignment with the first optical filter to compensate for a temperature dependence of the spectral response thereof according to known compensation values.

16. The method according to claim 14, wherein each of said first and second optical filters is provided in a corresponding waveguide segment.

17. The method according to claim 16, wherein said first and second optical filters are Bragg gratings.

18. The method according to claim 14, wherein the tuning of step a) comprises the substeps of:
   i. propagating a broadband light signal through the first and second optical filters successively, thereby obtaining an output light signal representative of the combined spectral responses of said optical filters;
   ii. sequentially, for each of said first and second optical filters:
      i) unstretching said optical filter while monitoring said an optical power of said output light signal; and
      ii) stopping said unstretching when said monitoring shows no variation in the optical power of said output light signal.

19. The method according to claim 14, comprising an additional step of:
   f) tuning at least one of the first and second optical filters to a target stretched position using pre-stored calibration tables.

20. A method for tuning first and second optical gratings, each of said optical gratings having a spectral response defining a plurality of periodical channels including a first and a second channel, the spectral response of each of said optical gratings being tunable by stretching the corresponding optical grating to a plurality of stretched positions, said spectral response of each of said optical gratings being known at an unstretched position where the first channel of the second grating has a central wavelength greater than the first channel of the first grating, said method comprising the steps of:
   a) tuning the first and second optical gratings to the unstretched position thereof;
   b) spectrally aligning the first channel of the second grating with the second channel of the first grating, said aligning comprising the substeps of:
      i. propagating a broadband light signal through the first and second optical gratings successively, thereby obtaining an output light signal representative of the combined spectral responses of said optical gratings;
      ii. progressively stretching the second optical grating, and monitoring a corresponding optical power of the output light signal during said stretching;
      iii. determining, based on said monitoring, an optimal stretched position of the second optical grating for which the spectral response thereof is aligned with the spectral response of the first optical grating; and
      iv. tuning the second optical grating to said optimal stretched position;
   c) spectrally aligning the first channel of the first grating with the first channel of the second grating, said aligning comprising the substeps of:
      i. propagating the broadband light signal through the first an second optical gratings successively, thereby obtaining said output light signal representative of the combined spectral responses of said optical gratings;
      ii. progressively stretching the first optical grating, and monitoring the corresponding optical power of the output light signal during said stretching;

iii. determining, based on said monitoring, an optimal stretched position of the first optical grating for which the spectral response thereof is aligned with the spectral response of the second optical grating; and iv. tuning the first optical grating to said optimal stretched position.

21. The method according to claim 20, further comprising a step of:

d) tuning at least one of the first and second optical gratings to a target stretched position using pre-stored calibration tables.

22. The method according to claim 21, wherein said first and second optical gratings form a variable dispersion compensating device.

23. The method according to claim 20, comprising an step between step b) and step c) of offsetting the second grating from alignment with the first grating to compensate for a temperature dependence of its spectral response according to known compensation values.

24. The method according to claim 20, wherein the determining of each of substeps b)iii. and c)iii. comprises plotting a power correlation profile defined as the optical power of the output signal as a function of stretched positions.

25. The method according to claim 24, wherein the determining of each of substeps b)iii. and c)iii. comprises calculating a curve fit of said power correlation profile.

26. The method according to claim 25, wherein said curve fit is a polynomial fit.

27. The method according to claim 24, wherein the determining of each of substeps b)iii. and c)iii. comprises comparing said power correlation profile to a pre-determined correlation profile of said optical gratings.

28. The method according to claim 27, wherein said comparing comprises using a least-squares residual minimization technique.

29. The method according to claim 27, comprising a preliminary step before step i. of measuring said pre-determined correlation profile of said optical gratings.

30. The method according to claim 29, wherein said preliminary step comprises the substeps of:

tuning each of said first and second optical gratings to an initial stretched position where the spectral responses thereof are precisely aligned, using spectrally-resolved measurements of said spectral responses;

propagating a calibrating broadband light signal through the first and second optical gratings successively, thereby obtaining a calibrating output light signal representative of the combined spectral responses of said gratings;

measuring an optical power of the calibrating output light signal for a plurality of stretched positions of one of the first and second optical grating on either sides of the initial stretched position thereof;

plotting the optical power of the calibrating output light signal as a function of stretched positions, thereby obtaining said pre-determined correlation profile; and identifying a position along said pre-determined correlation profile for which the spectral responses of the first and second gratings are aligned.

31. In an optical device including first and second optical filters, each of said optical filters having a spectral response defining a plurality of periodical channels, said device comprising:

a tuning mechanism for tuning each of said optical filters to one of an unstretched position for which the spectral response of the corresponding filter is known and a plurality of stretched positions for which said spectral response is modified;

a broadband light source for generating a broadband light signal;

an optical arrangement for propagating said broadband light signal through the first and second optical filters successively, thereby obtaining an output light signal representative of the combined spectral responses of said optical filters;

a detector for detecting said output light signal; and a controlling application for controlling said optical device, the improvement wherein said controlling application comprises a calibrating module for calibrating the first and second optical filters, said calibrating module performing the steps of:

a) instructing the tuning mechanism to tune the first and second optical filters to the unstretched position thereof;

b) instructing the tuning mechanism to stretch the second optical filter;

c) causing the precise alignment of the spectral response of the second optical filter with the spectral response of the first optical filter through the substeps of:

i. instructing said broadband light source to propagate said broadband light signal through the first and second optical filters successively, thereby generating the output light signal representative of the combined spectral responses of said optical filters;

ii. instructing the tuning mechanism to tune the second optical filter to a plurality of test stretched positions and obtaining, from the detector, a corresponding optical power of the output light signal for each of said test stretched positions;

iii. determining, based on said corresponding optical power, an optimal stretched position of the second optical filter for which the spectral response thereof is aligned with the spectral response of the first optical filter; and iv. instructing the tuning mechanism to tune the second optical filter to said optimal stretched position;

d) instructing the tuning mechanism to stretch the first optical filter; and e) causing the precise alignment of the spectral response of the first optical filter with the spectral response of the second optical filter, through the substeps of:

i. instructing said broadband light source to propagate said broadband light signal through the first and second optical filters successively, thereby generating the output light signal representative of the combined spectral responses of said optical filters;

ii. instructing the tuning mechanism to tune the first optical filter to a plurality of test stretched positions and obtaining, from the detector, a corresponding optical power of the output light signal for each of said test stretched positions;

iii. determining, based on said corresponding optical power, an optimal stretched position of the first optical filter for which the spectral response thereof is aligned with the spectral response of the second optical filter; and iv. instructing the tuning mechanism to tune the first optical filter to said optimal stretched position.

32. The improvement to an optical device according to claim 26, wherein said calibration module further performs a step of:

f) instructing the tuning mechanism to tune at least one of the first and second optical filters to a target stretched position using pre-stored calibration tables.

33. The improvement to an optical device according to claim 26, wherein said calibration module further performs, between step c) and step d), a step of instructing the tuning mechanism to offset the second optical filter from alignment with the first optical filter to compensate for a temperature dependence of its spectral response according to known compensation values.

* * * * *